United States Patent [19]
Daniel et al.

[11] Patent Number: 5,720,510
[45] Date of Patent: Feb. 24, 1998

[54] ENERGY ABSORBING VEHICLE PILLAR STRUCTURE

[75] Inventors: Roger Pitman Daniel, Dearborn; Praful Patel, Novi; George G. Lim, Northville, all of Mich.

[73] Assignee: Ford Global Technologies, Inc., Dearborn, Mich.

[21] Appl. No.: 755,539

[22] Filed: Nov. 21, 1996

Related U.S. Application Data

[62] Division of Ser. No. 623,519, Mar. 28, 1996, Pat. No. 5,609,385.

[51] Int. Cl.$^6$ .................................................. B60R 27/00
[52] U.S. Cl. ........................... 296/188; 296/189; 296/203; 280/751
[58] Field of Search .................................. 296/203, 188, 296/189, 205; 280/751, 748

[56] References Cited

U.S. PATENT DOCUMENTS

| | | | |
|---|---|---|---|
| 3,779,595 | 12/1973 | Suzuki et al. | 296/189 |
| 4,591,204 | 5/1986 | Gallitzendoerfer et al. | 296/202 |
| 5,042,872 | 8/1991 | Yoshii | 296/203 |
| 5,163,730 | 11/1992 | Welch | 296/189 |
| 5,564,744 | 10/1996 | Frost . | |
| 5,575,500 | 11/1996 | Mimura et al. . | |

FOREIGN PATENT DOCUMENTS

| | | | |
|---|---|---|---|
| 254635 | 1/1988 | European Pat. Off. . | |
| 404056687 A | 2/1992 | Japan | 296/203 |
| 406239189 A | 8/1994 | Japan | 280/751 |

Primary Examiner—Gary C. Hoge
Attorney, Agent, or Firm—Neil P. Ferraro

[57] ABSTRACT

An improved structure is provided for supporting pillars of automotive vehicles which provides energy absorption through provision of three stamped metallic panels (24, 26, 28) defining first and second energy absorbing chambers (56, 58) therebetween and an interior trim cover (30) joined to all the panels and defining a third chamber (62) between it and the interior of the three panels and selected energy absorbing media carried between the trim cover and the interior of the panels. Generally C-shaped spring structures (74) and plastic honeycomb structures (68) are preferred for the energy absorbing media.

3 Claims, 2 Drawing Sheets

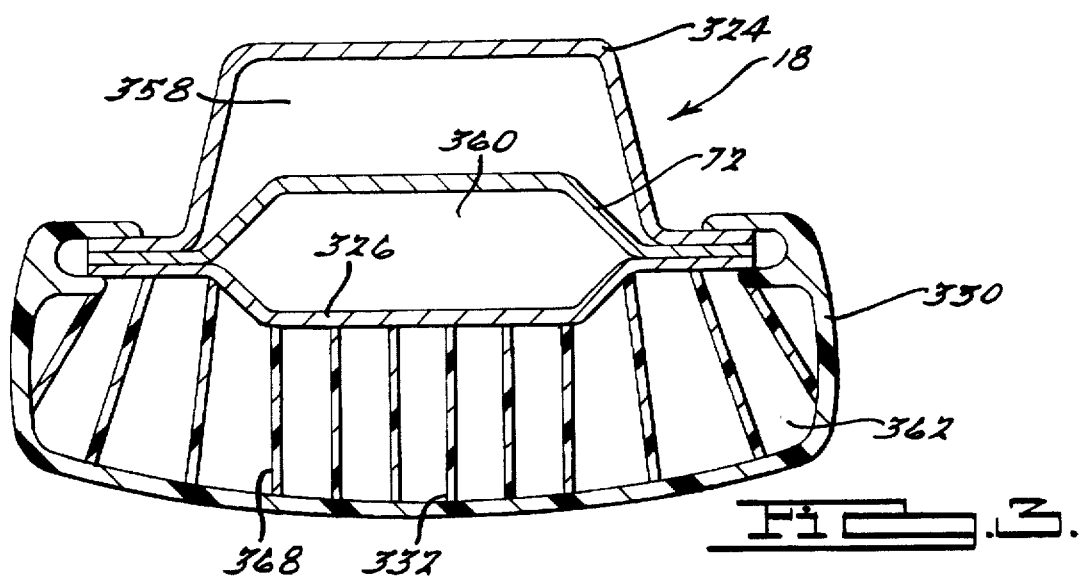
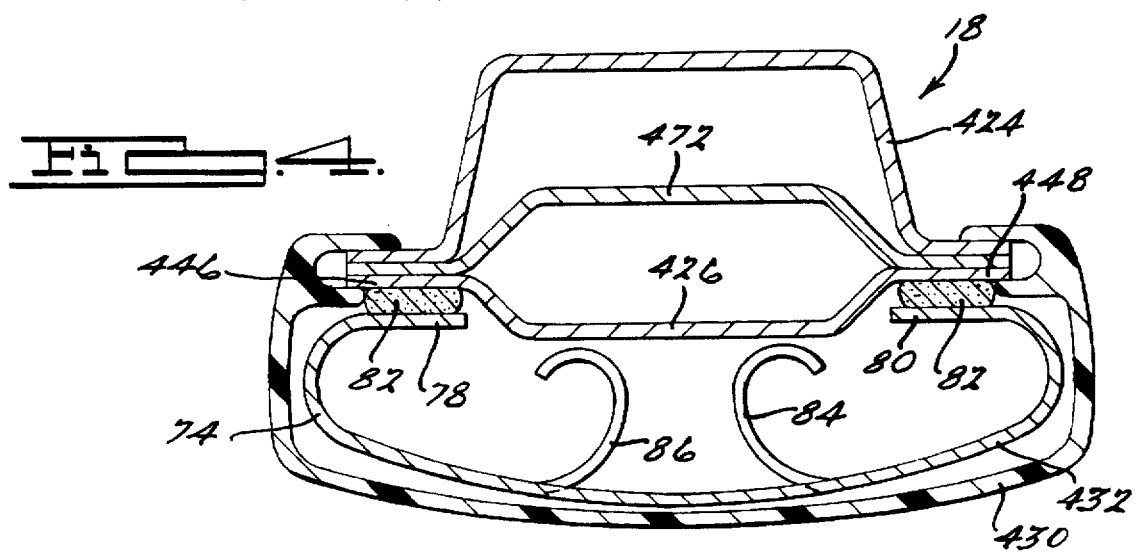
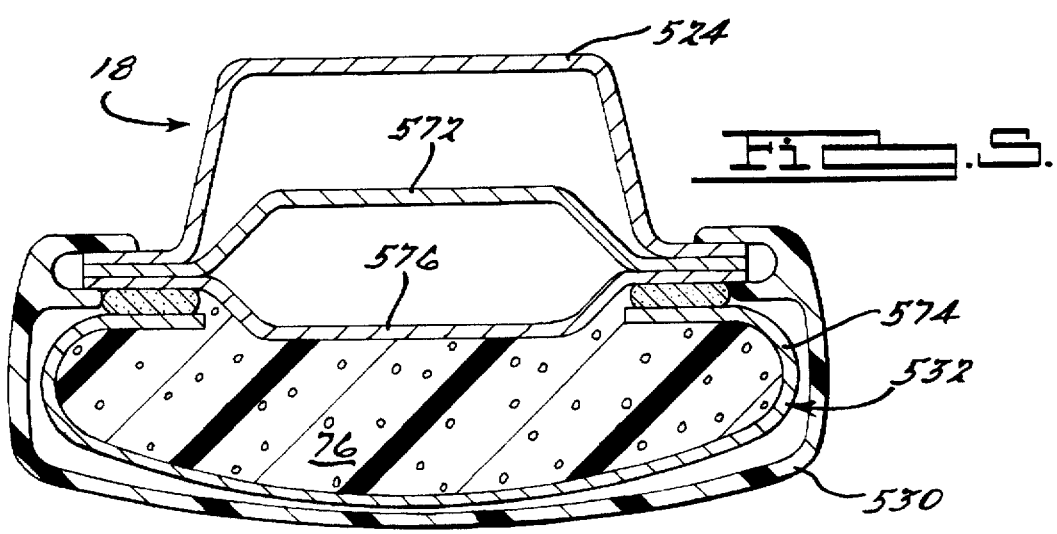

ENERGY ABSORBING VEHICLE PILLAR STRUCTURE

This is a divisional application of prior application Ser. No. 08/623,519 filed Mar. 28, 1996 (now U.S. Pat. No. 5,609,385).

BACKGROUND OF THE INVENTION

1. Technical Field

The present invention relates generally to automotive vehicle body structure, and more particularly to the construction of automotive vehicle pillars to accommodate energy absorption.

2. Description of the Prior Art

In the design of modern automotive vehicles, it is has been the goal to provide body structures which manage the absorption of energy in response to the imposition of frontal loads. More recent design activity in the vehicle body arts has been directed to the management of energy imposed on the vehicle occupant compartment in response to loads imposed on the sides of the vehicle and to loading imposed within the vehicle occupant compartment. While the cushioning of surfaces facing the vehicle occupant compartment has long been practiced in the automotive industry, the basic, usually metal, structure of the body itself has been accommodated rather than made an integral part of the energy management design, although early designs, such as that exemplified in U.S. Pat. 3,560,020 to Barenyi, indicate the general principle of cushioning such structure is known.

SUMMARY OF THE INVENTION

It is an object of the present invention to define an energy absorbing pillar structure which enhances the capability of the pillar to absorb energy in response to loads laterally imposed with respect to the vehicle.

This is accomplished through providing such a structure that includes an exterior panel, an interior panel, and an intermediate panel secured together to define a pair of energy absorbing chambers between the panels, and providing a trim cover joined to the panels in which energy absorbing media are carried between the trim panel and the outer panel of the pillar in a third energy absorbing chamber.

BRIEF DESCRIPTION OF THE DRAWINGS

The efficacy of the invention pillar structure and its advantages over the prior art will become apparent to those skilled in the automotive body arts upon reading the following description with reference to the accompanying drawings, in which:

FIG. 3 is a cross-sectional view taken along line 3—3 of FIG. 1;

FIG. 4 is a cross-sectional view similar to FIG. 3 illustrating an alternative embodiment; and FIG. 5 is a cross-sectional view similar to FIG. 3 illustrating yet another alternative embodiment.

DESCRIPTION OF THE PREFERRED EMBODIMENT

Figure 1:
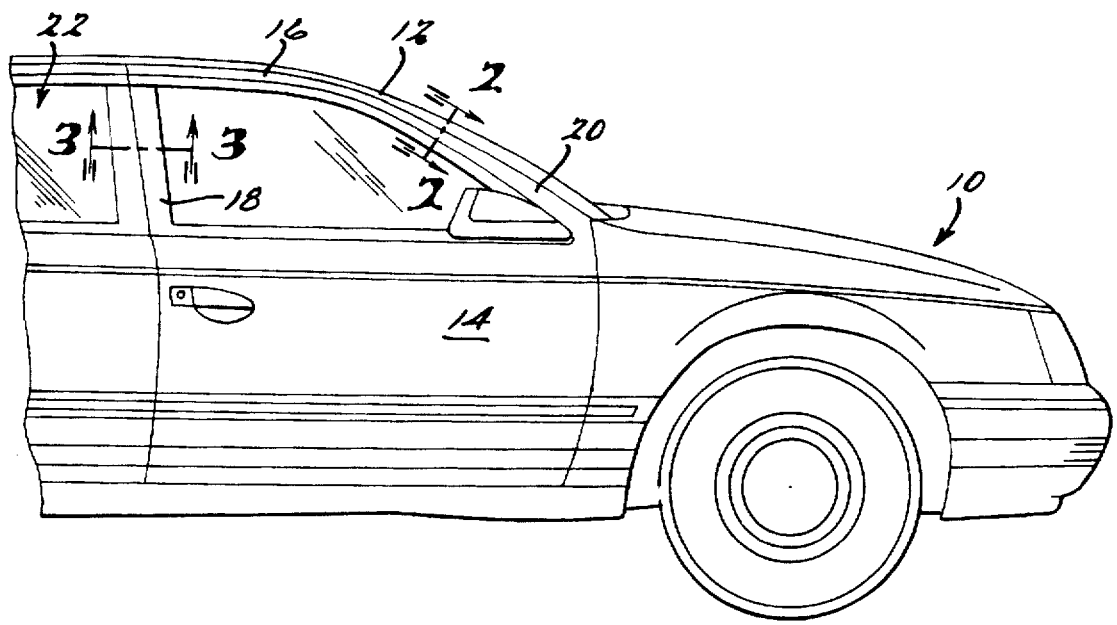
FIG. 1 is a partial side view of an automotive vehicle.

Turning now to the drawings, in particular to FIG. 1 thereof, an automobile 10 is illustrated as having a body 12 having a lower portion such as indicated at the door 14, a roof portion 16, and pillars 18, 20. As is conventional, the pillars 18, 20 provide support for the roof 16 in closing the vehicle occupant compartment indicated generally at 22.

According to the present invention, the pillars 18, 20 are constructed to enhance energy absorption in response to loads imposed laterally of the pillars. As used herein, it is to be understood that the pillars 18, 20 extend generally vertically between the lower portion 14 of the vehicle 10 and the roof 16, and that loads imposed generally normal to this vertical extent are referred to as lateral or side loads.

The pillars 18, 20 are preferably fabricated as metal stampings. According to the present invention, they are configured to enhance energy absorption both by the shape and arrangement of the metal stampings and by cooperation with interior trim structure to define an overall energy absorbing pillar structure.

Figure 2:
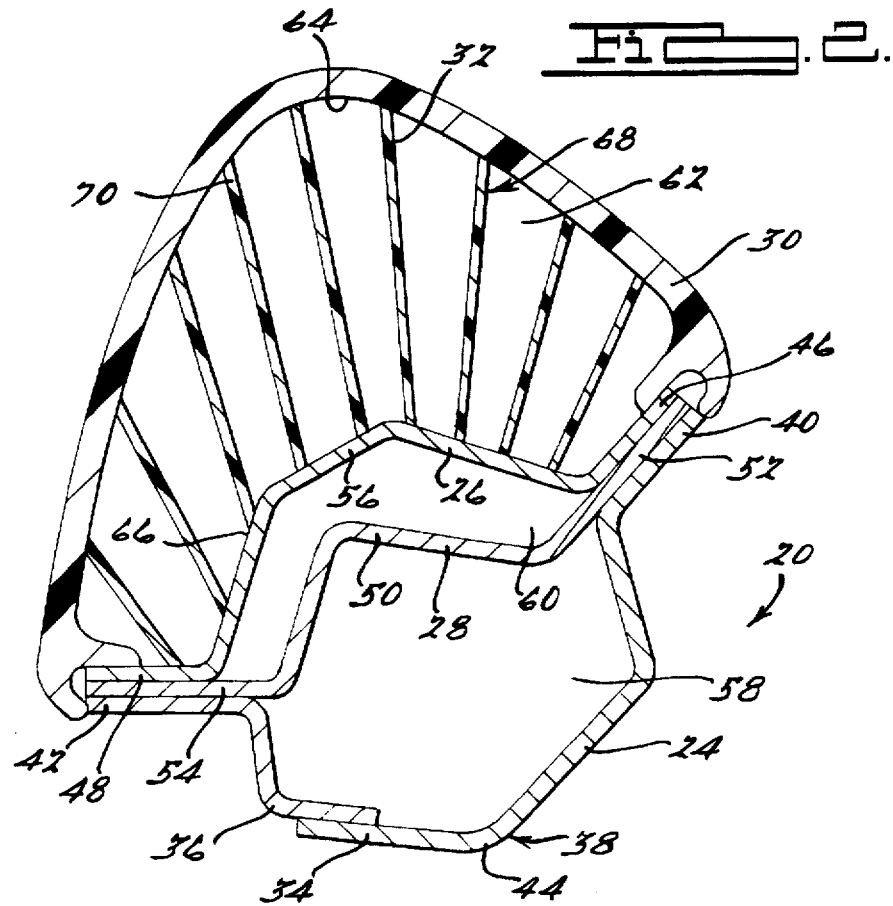
FIG. 2 is a cross section taken along line 2—2 of FIG. 1.

Turning now to FIG. 2, one preferred embodiment for the front or A-pillar 20 is illustrated as including an exterior panel 24, an interior panel 26, an intermediate panel 28, a trim cover 30, and energy absorbing media 32 disposed between the internal panel 26 and the trim cover 30.

The exterior panel 24, which is illustrated in FIG. 1, includes first and second panels 34, 36 joined together as by welding to define an outwardly concave external surface 38. First and second peripheral flange portions 40, 42 bound an outwardly concave section 44 to define a truss-like structure.

The interior panel 26 likewise includes first and second peripheral flanges portions 46, 48 positioned in facing relationship with respect to the flange portions 40, 42 of the exterior panel. A concave inward truss portion 56 extends between the flange portions 46, 48.

Sandwiched between the exterior panel 24 and interior panel 26, the intermediate panel 28 likewise includes peripheral flange portions 52, 54 which are clamped between facing peripheral flange portions of the exterior panel 24 and the interior panel 26, and may be secured thereto by welding or like fixing process. A central bridge truss portion 50 extends between the flange portions 52, 54 and in the embodiment of FIG. 2 is illustrated as being generally concave inwardly.

With the panels 24, 26, 28 so arranged, a first energy absorbing chamber 58 is defined between the exterior panel 24 and the intermediate panel 28, and a second energy absorbing chamber 60 is defined between the interior panel 26 and the intermediate panel 28.

The generally concave inward trim cover 30 is preferably formed as a molded plastic part and is secured to the joined ends of the peripheral flange portions of the panels 24, 26, 28 and defines a third energy absorbing chamber 62 between the interior surface 64 of the trim cover 30 and the exterior surface 66 of the interior panel 26. According to this preferred embodiment, the energy absorbing medium 32 is preferably configured as a plastic honeycomb structure, indicated generally at 68, of known configuration. Such honeycomb structures include a plurality of ribs, such as that indicated at 70, which extend end-for-end from the interior surface 64 of the trim cover 30 to the exterior surface 66 of the interior panel 26 and may define polygonal cells as is well known in the automotive vehicle body arts. The honeycomb structure 68 may be a separate molded part; it may also be molded integrally with cover 30 or may be fixed to cover 30 through mechanical means such as staking or through adhesives.

Turning next to FIG. 3, adaptation of preferred embodiment of FIG. 1 to the rear or B-pillar 18 of the vehicle 10 is illustrated. As the descriptions of the other embodiments perceived, detailed description of substantially identical components will be avoided and the drawings will be noted to refer to like parts with like numbers, preceded by the figure number of the embodiment being described. In the B-pillar embodiment of FIG. 3, it is to be noted that an intermediate panel 72 is configured to be generally concave outward and parallel to the exterior panel 324. The remainder of the construction is substantially identical to the A-pillar construction of FIG. 2. The exterior panel 324 and the interior panel 326 are joined with the intermediate panel 72 at peripheral flange portions, and a first chamber 358 and a second chamber 360 are formed between these stamped panels. A third chamber 362 is formed between the panel 326 and the molded plastic trim cover 330, and molded plastic honeycomb structure 368, appropriately shaped to the construction of pillar 18, is provided as an energy absorbing medium.

Turning next to FIG. 4, the configuration in this embodiment for the pillar 18 is essentially identical to that in FIG. 3 save the provision of an alternative energy absorbing medium 432, preferably defined as a generally C-shaped, outward opening, resilient spring member 74. Its energy absorbing capability may be enhanced through the provision of turned-back coil portions 84, 86 positioned in juxtaposition with the interior panel 426. The spring member further includes turned-in end portions 78, 80 which are secured to peripheral flange portions 446, 448 through the application of adhesive, indicated generally at 82.

Turning lastly to FIG. 5, yet another energy absorbing medium is indicated at 532, differing from the medium 432 illustrated in FIG. 4 in that the spring member 74 may carry foam material 76 in its interior to enhance its energy absorbing capability.

In each of the embodiments shown, the energy absorbing capability of the structural pillars of the automotive vehicle 10 is improved over the prior art through the provision of three stamped metal panels and a molded plastic trim cover which together define three energy absorbing chambers, the inner one of which houses various preferred energy absorbing media.

While only certain embodiments of the pillar structure of the present invention have been shown and described, others may be occur to those skilled in the automotive vehicle body arts which do not depart from the scope of the appended claims.

What is claimed is:

1. An energy absorbing pillar structure for an automotive vehicle comprising:

an exterior panel arranged in generally vertical orientation to define an outwardly concave exterior surface of the vehicle;

an interior panel arranged in longitudinal registration with the exterior panel and defining an interior surface convex with respect to the exterior panel exterior surface;

an intermediate panel fixedly secured between the exterior panel and the interior panel to define a first chamber with the exterior panel and a second chamber with the interior panel;

means defining peripheral flange portions for joining the exterior, interior, and intermediate panels together;

a trim cover joined to the peripheral flange portions and having a third chamber formed therein inwardly adjacent the interior panel; and a generally C-shaped resilient metal spring structure having turned-in end portions and carried within the third chamber, with the spring structure being fixedly secured to the inner panel through adhesive interposed between the turned-in portions and the inner panel peripheral flange portions.

2. An energy absorbing pillar structure for an automotive vehicle, comprising;

an exterior panel arranged in generally vertical orientation to define an outwardly concave exterior surface of the vehicle;

an interior panel arranged in longitudinal registration with the exterior panel and defining an interior surface convex with respect to the exterior panel exterior surface;

an intermediate panel fixedly secured between the exterior panel and the interior panel to define a first chamber with the exterior panel and a second chamber with the interior panel, the second chamber being arranged in series relationship with the first chamber, the intermediate panel defining a central bridge truss portion having a shape generally complementary with one of the exterior or interior panels;

means defining peripheral flange portions for joining the exterior, interior, and intermediate panels together;

a trim cover joined to the peripheral flange portions and having a third chamber formed therein inwardly adjacent the interior panel, the third chamber being arranged in series relationship with the first and second chambers; and a generally C-Shaped resilient metal spring structure having turned-in end portions and carried within the third chamber, with the spring structure being fixedly secured to the inner panel through adhesive interposed between the turned-in portions and the inner panel peripheral flange portion.

3. An energy absorbing pillar structure as defined in claim 2, wherein said intermediate panel is generally concave inwardly.

* * * * *